Sept. 20, 1949.　　　　A. H. SCHUTTE　　　　2,482,138
REACTOR FOR THERMAL CONVERSION OF HYDROCARBONS
Filed June 24, 1947　　　　　　　　　　2 Sheets-Sheet 2
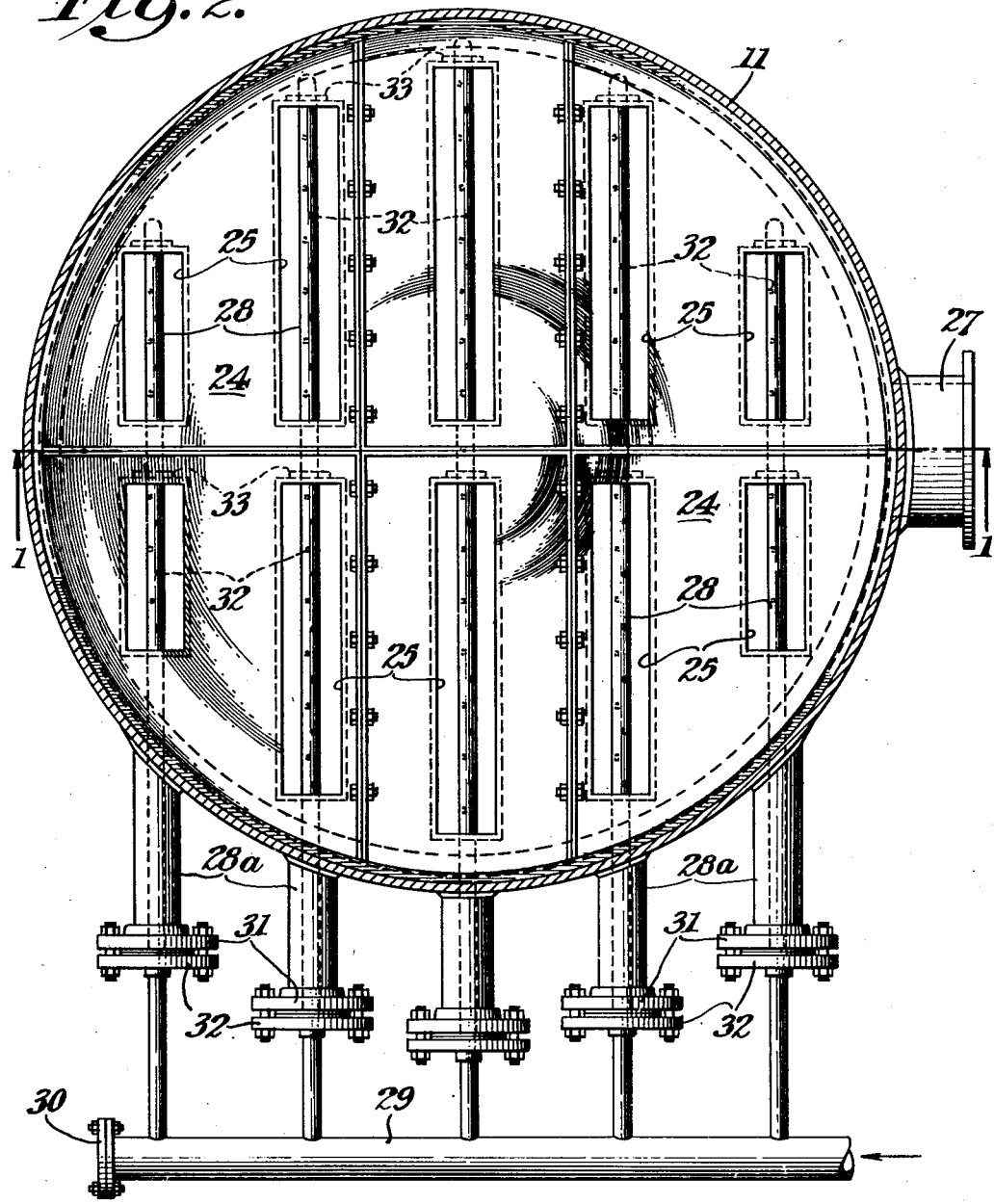
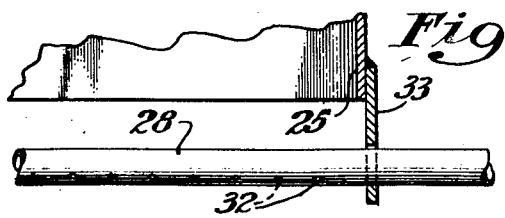
INVENTOR.
August Henry Schutte
BY Nathaniel Ely
ATTORNEY Patented Sept. 20, 1949

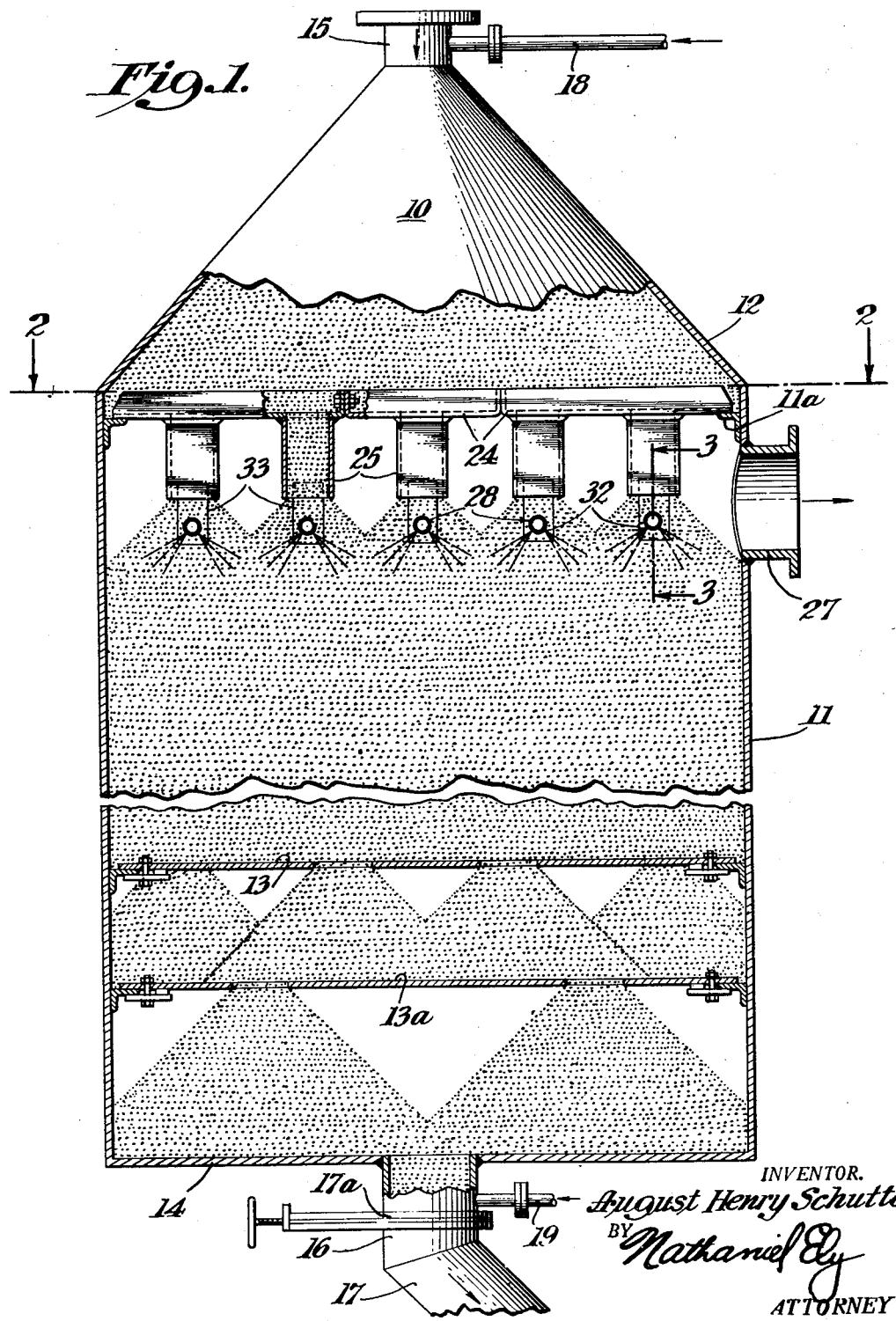

2,482,138

UNITED STATES PATENT OFFICE 2,482,138

REACTOR FOR THERMAL CONVERSION OF HYDROCARBONS

August H. Schutte, Hastings on Hudson, N. Y., assignor to The Lummus Company, New York, N. Y., a corporation of Delaware Application June 24, 1947, Serial No. 756,643

2 Claims. (Cl. 23—284)

The invention relates particularly to improvements in the conversion of heavy liquid phase hydrocarbons into vapors and dry coke as the result of a contact with a continuously flowing discrete particle bed through a sealed reactor. More particularly, the invention is a continuation-in-part of the invention shown in my copending applications, Ser. No. 577,707, filed February 12, 1945, and Ser. No. 651,598, filed March 2, 1946.

It has been determined that heavy hydrocarbons can be continuously reduced to their vapor constituents and with the carbon residue reduced to dry coke by spreading the liquid on a continuously moving bed of contact particles passing by gravity alone through a vertical reactor. The contact particles are preheated to supply a substantial part of the heat required. If the particles are moved continuously through the reactor for a sufficient length of time a dry hard coke is formed which does not agglomerate and passes through the outlet as a free-flowing homogeneous mixture. It is important that the bed flow be uniform and continuous and that the charge of hydrocarbon be supplied in a uniform manner across the cross section of the bed and that the creation of a fog or splashing droplets be avoided to prevent coking of the stationary surfaces of the apparatus.

It is the principal object of my invention to provide unique apparatus for uniformly distributing a hot hydrocarbon liquid to a continuously moving bed of solid particles.

A further object of my invention is to provide a simplified, easily maintained liquid distributor for establishing uniform flow of liquid throughout the cross section of the reactor in which the liquid is spread at fixed points usually below the contact mass, with a continuous downward movement of the bed continuously presenting fresh contact material to the feed.

A further object of my invention is to provide an upper bed distributor for the contact material provided with a series of transversely extending longitudinal openings having depending walls to form vertical chutes spaced from one another so that there is a division of the granular material into the upper part of the reactor, the material forming in rows of alternate ridges and furrows, the furrows serving as vapor releasing spaces and the ridges covering the oil feed conduits to prevent foaming or splashing of the liquid.

A further important feature of my invention is to provide for uniform gravity flow of the bed as well as uniform and prompt removal of the released hydrocarbon vapors.

Further objects and advantages of my invention will appear in connection with the description of the attached drawings in which:

Figure 1 is a vertical substantially central section with parts in elevation of a reactor showing an arrangement for liquid application.

Figure 2 is a horizontal cross section taken substantially along the line 2—2 of Figure 1.

Figure 3 is an enlarged vertical cross section of the distributing conduit taken along the line 3—3 of Figure 1.

As pointed out in my prior applications, the disposition of heavy hydrocarbon by-products of cracking, distillation and like operations, comprising bottoms, tars and the like, has represented a major operating problem in the petroleum industry. While it has been recognized that the conversion of these by-products into valuable convertible liquid products and coke would solve this problem, all former attempts have resulted in the use of expensive, complicated and cumbersome mechanisms requiring excessive operating and cleaning labor and of relatively low efficiency. According to this invention the use of coking drums, mechanical conveyors, grates and other like coke deposit receiving mechanisms is totally obviated.

The heavy hydrocarbon feed is spread or distributed on the moving particles of a solid phase, free flowing gravity bed made up of discrete solid particles, the particles receiving substantially all of the coke deposit whereby lumping, agglomeration or sticking together of the bed particles is obviated. This sticking is avoided by limiting the spread density of the feed upon the particles in such manner that that portion of the feed which does not "flash off" or evaporate upon contact with the hot bed particles (the sensible heat of which furnishes the coking heat or a major portion thereof) does not exceed in volume the film surface and the pore volume of the discrete bed particles.

Thus, upon spreading the feed upon the bed particles, a part thereof is "flashed off" or evaporated upon contact with the hot bed particles and withdrawn as useful vapors which may be taken off, for further processing, to any suitable station. The remainder of the feed which does not flash off or evaporate is taken up or received by the internal and external surfaces of the particles substantially entirely whereby formation of sticky films between the discrete bed particles sufficient in depth or thickness to destroy the free flowing properties of the bed is totally obviated.

No oxygen or oxygen containing gases or vapors are present at any point in this reaction. Therefore, no oxidation can occur and there is no flue gas and no other combustion products to be concerned with in the reaction described or in the recovery and/or processing of the vaporous products taken out by the vapor outlet. The presence of such oxygen containing vapors or gases along with flue gas, heretofore almost universally present in attempts at "bed coking" of residual liquid hydrocarbons, has precluded adequate temperature control in the coking reaction zone and rendered difficult the recovery and/or processing of the vaporous products of the coking reaction.

The overall mechanism of conversion described above results in the formation of product gas oil fractions of near-virgin quality, unoxidized, and only very slightly cracked. Furthermore, the vapors produced by the invention herein described contain gasoline fractions which have a higher octane number than gasoline fractions produced by conventional coking methods employing long-time soaking as in "drum coking" and the like. Experiments show the octane number improvement to be in the order of five (5) to fifteen (15).

Referring to the drawing in detail, and with reference particularly to Figs. 1 and 2, the reactor is generally designated 10 and is shown, for purposes of illustration, as comprising a vertical tank-like enclosure having a rectangular or cylindrical casing wall 11 and top portion continuing therefrom and designated 12 and a bottom 14 which may be of any desired shape including horizontal and flat. Leading into the top portion 12 is the inlet 15 through which the heated porous bed particles are fed, as hereinafter described, to form a free-flowing gravity bed. A suitable outlet 16 extends from the lower end portion 14 and terminates in the delivery duct or outlet 17 which delivers the bed particles, with coke deposits to any suitable collection station. The lower end of the reactor 10 is provided with suitable known means 13 and 13a for controlling the rate of feed or passage of bed particles uniformly through the chamber 11. Specifically these may consist of baffles having proportional openings at predetermined spacing to assure a uniform bed flow to the relatively small discharge outlet. If desired simple mechanical means may be employed to control the solids flow. The slide or other valve 17a controls the discharge from the reactor and, together with a suitable granular contact material feeding means for inlet 15 will establish a mass or column of contact material filling the reactor as much as a gravity packed mass will accomplish.

Leading into the end portion 12 or into the inlet 15 is a sealing steam or purge gas inlet 18 through which sealing steam or purge gas is applied to prevent the passage of cracked vapors and the like upwardly through the bed material and out the inlet 15 and to prevent leakage of the atmosphere in inlet 15 into the reactor. A similar sealing inlet 19 is provided at the junction of the end portion 14 and the outlet 16 to prevent the passage of vaporous products downwardly out of the reactor 10 with the bed particles and coke deposits issuing from the outlet 17. The interior of the reactor may be lined with insulation if desired.

At the upper part of the reactor, I provide a parting wall or baffle 24 provided with a plurality of chutes or elongated conduits 25 which are conveniently elongate and rectangular as shown in Fig. 2 and have walls which extend into the hydrocarbon reaction space below the wall or baffle 24 and provide restricted entrance paths of the bed material flowing through the baffle 24 under control of the slide valve 17a and the flow plates 13, and 13a.

The vapor outlet 27 from the reaction space extends from the feed and vapor release space on the interior of the reactor 10 immediately below the wall or baffle 24 to any suitable collecting station to which it is desired to convey the vaporous products of the reaction occurring within the reactor 10. These chutes extend transversely across the reactor and are so arranged as to assure substantially uniform flow of contact material at the upper or charge spreading zone of the reactor while allowing free flow of vapors to outlet 27. The contact mass thus forms in substantially parallel transverse rows of furrows and ridges as shown in Fig. 1 having "angles of repose" wherein they are in substantial movement.

In a preferred construction, the baffle 24 may consist of a series of independent sections which may be bolted together or independently supported on transverse beams so that the sections may be small enough to handle and insert in the reactor and remove from the reactor if necessary. The baffle 24 may be appropriately secured to a marginal ring or support 11a in a well-known manner.

The liquid feed spreading mechanism comprises a plurality of perforate pipe-like conduits 28 passing through glands in the wall of the casing and all connected with a common header 29, as shown in Fig. 2, such header having one end thereof closed by a plate 30, and the other end of the header 29 being connected to any suitable source of heavy hydrocarbons comprising the feed material desired to be spread in the pores of the bed material. The feed distributors or spreaders 28 are provided with apertures 32 for distributing the liquid on the bed and are preferably closed at the ends remote from the header 29.

In order to clean or service the feed distributor or spreaders 28, for instance by cleaning the apertures thereof, the assembly comprising the header 29 and attached conduits or spreaders 28 is removable axially of the wall-mounting sealing nozzles 28a as a unit from the interior of the reactor, the feed spreaders or distributors 28 having plates 32 welded thereto in suitable location and each plate being adapted to engage the outer flange 31 of the nozzles 28a to which the plates 32 are bolted, all as shown in Fig. 2. A plurality of depending bracing angles designated 33 are welded to the edges of the chutes 25 and provided with openings for slidably receiving and supporting the spreaders or distributors 28.

As shown in Fig. 1, the spreaders or distributors 28 are preferably located in the path of flow of the contact material which is dry and free of foreign material above baffle 24 and, being under and immediately beneath the transverse rows of apertures and depending chutes 25, the contact material provides a closed or covered section for hydrocarbon feed with the vapor release portion in the furrows between the ridges immediately beneath the baffle or wall 24.

The feed spreaders or distributors are located in the path of the contact material so that the heavy hydrocarbon material comprising the feed is allowed to pass from the apertures 32 in the spreaders or distributors 28 in relatively fine streams (as distinguished from atomizing sprays) into the particles which are moving down into the ridge portions of the bed whereby the feed is applied to the discrete bed particles when they are undergoing movement. This effectively prevents any release of vapors or mist into the vapor space that might otherwise engage the walls of the reactor and cause premature coking.

Steam or inert gas may be added to the oil feed to control the velocities in the distributor system to obtain uniform feeding and to minimize thermal cracking in the distributor pipes and manifolds.

The vaporous products of the reaction occurring when the hydrocarbon feed material is contacted with the hot porous moving bed particles issuing from the chutes 25, shown in Fig. 1 is released in the furrows between the ridges and is readily and quickly removed at 27 before any objectionable degradation of the vapors can occur. The depth of wall of chutes 25 is a function of the necessary vapor volume to provide prompt discharge.

The openings 32 are preferably at an angle to the vertical to minimize velocity effects, the conduits 28 being sufficiently narrow to assure the application of the feed onto thin flowing streams of solid particles.

In operating the above structure to perform the method heretofore described, bed particles from $\frac{1}{16}''$ to $\frac{3}{4}''$ major dimension in lump, pellet, or extruded form, are fed by suitable means (not shown) into the inlet 15 at from 800° F. to 1,300° F. introduction temperature, and preferably at from 850° F. to 1,050° F. introduction temperature.

The bed particles may comprise any one, or a mixture of more than one, of the class of known porous materials including "Koppers coke," "petroleum coke," "Alundum," "Carborundum," "pumice," "crushed fired brick," "ceramic particles," or of "cracking catalyst particles or beads."

The feed comprises such heavy hydrocarbons as "bottoms," heavy petroleum residues, and hydrocarbon residuals, especially those resulting from other petroleum refining operations such as cracking, distillation, topping, etc. This feed is injected at from 100° F. to 1,000° F., and preferably at from 700° F. to 900° F. It is spread upon the moving particles as described above, to prevent any part of the feed issuing or being entrained directly from the spreaders or distributors 28 and carried away by the vapor outlet 27.

The temperature of the bed particles issuing from the reactor is from 800° F. to 1,000° F., and the coke deposited on the outgoing bed particles represents from ½% to 10% by weight of the particles, and is usually in the neighborhood of 5% by weight.

The operating pressure in the reactor 10 is relatively low but operations at substantial pressure may be obtained if desired.

As these loaded bed particles pass downwardly through the body of the reactor 10, sufficient residence time is provided for the coking reaction to proceed to completion or, in other words, for the liquid hydrocarbon load on the bed particles to be converted or cracked into lighter hydrocarbon vapors which pass up through the bed to the vapor outlet 27 leaving a residue of dry coke deposited in and on the discrete bed particles. The particles in this condition pass out of the reactor through the outlet 17.

The above mentioned residence or conversion time at normal operating temperatures during which vapors are still being released, may range from 5 to 50 minutes.

The capacity of a unit of this type will vary with the nature of the contact material. With a non-porous coke for example, the reactor may be of approximately fifteen feet in diameter by sixty-four feet in height with a passage of three hundred tons of contact material per hour. This will permit a charge of four thousand five hundred barrels of heavy oil per day. If a very porous contact material is used, the size of the reactor may be reduced to about fifteen feet by thirty-two feet, and the circulation rate reduced to about one hundred fifty tons per hour and with a feed rate of approximately eight thousand five hundred barrels per day.

Due to the above described method of operation and to the depth of the bed of porous particles in the coking zone below the feed point an unique and valuable effect is secured because, as the heavy hydrocarbon liquid on the bed particles is gradually reduced to a coke residue, the vapors evolved are subjected to increasing cracking time in their passage through the bed of particles on their way to the vapor outlet 27. Thus, the earlier evolved vapors are not overcracked and the final portions of vapor evolved just before the liquid deposit goes to dryness are cracked sufficiently to be satisfactorily reduced in boiling range to a condition suitable for further processing. This selective cracking effect on the vapors evolved by the coking reaction cannot be obtained in methods employing either coking drums or shallow coking zones. Furthermore, at the solids entrance temperatures usually employed, a portion of the hydrocarbon feed vaporizes immediately on contact with the bed particles. This vaporization is more extensive and less destructive than that which could be obtained by conventional means such as fired heaters. Because of the above advantages, it is possible to secure higher yields of valuable vaporous products with less degradation of the charge to undesirable products such as coke and gas.

The removal of the vapors at the top or highest temperature end of the bed prevents the cooling of these vapors, keeps them superheated, and prevents apparatus coking due to heavy ends condensing out at the vapor dew point. The vapors leaving outlet 27 are quenched rapidly outside the reactor to arrest further reaction, as well known in the art.

The above described cycle is continuous, i. e., the amount of bed material fed into the inlet 15 substantially balances the output of the outlet or delivery 17 and it is, of course, to be understood that any suitable known means may be provided to maintain this balance such as the structure shown in co-pending applications of August Henry Schutte et al., S. N. 510,118, filed November 13, 1943, for Treating hydrocarbons, S. N. 510,119 filed November 13, 1943, for Continuous coking. These two applications have been abandoned in favor of an application Serial No. 3,747 of August Henry Schutte et al., filed January 22, 1948, and entitled "Method of hydrocarbon conversion."

A modification of the structure to permit multiple saturation of the bed particles by the heavy unflashed feed material before the bed material and deposited coke are removed from the outlet or delivery 17 may be particularly advantageous where it is practical to introduce more sensible heat with the bed solids than would be required to carry out the conversion of the unflashed feed material in a single contact. In such case additional feed zones would be spaced from each other so that sufficient residence time is achieved for substantially complete drying out of the unflashed feed material and the completion of the coking reaction before the particles are contacted with further unflashed feed material in the succeeding zone.

In the preferred form of apparatus, I extend the conduits 28 into the bed of contact material in such a manner that the feed apertures are normally covered by fresh bed. While this has the advantage of preventing entrainment of the liquid, it has the disadvantage of forcing the vapors through hot contact material which tends to unnecessarily cool the bed and superheats the vapors. In cases where minimum thermal cracking is desired it is desirable to have the vapor path as short as possible through the contact material. It may also be desirable to distribute the liquid between the rows provided no splashing on the reactor surfaces can take place.

It is, of course, to be understood that the above description is merely illustrative and in no wise limiting, and that I desire to comprehend within my invention such modifications as are included within the scope of the following claims.

I claim:

1. A reactor for thermal contact conversion of liquid hydrocarbons, comprising a casing defining a vertical reaction chamber having inlet and outlet means at the upper and lower portions thereof respectively to feed by gravity a continuous granular mass of contact material downwardly through said chamber; a partition baffle extending across the reaction chamber at an upper level therein and having elongated openings therein for dividing the downwardly moving contact material into a series of paths, each of said openings having a correspondingly shaped discharge chute depending therefrom below the baffle; a removable delivery conduit assembly including a plurality of pipe-like conduits passing through glands in the wall of the casing and extending across the reaction chamber beneath the respective discharge chutes, said pipe-like conduits having distributed discharge openings arranged to spread a liquid hydrocarbon charge over the cross-sectional area of the chamber; supporting means carried by the end portions of said chutes and having openings slidably receiving and retaining said pipe-like conduits; and vapor outlet means connected with the reaction chamber below the baffle.

2. A reactor for thermal contact conversion of liquid hydrocarbons, comprising a casing defining a vertical reaction chamber having inlet and outlet means at the upper and lower portions thereof respectively to feed by gravity a continuous granular mass of contact material downwardly through said chamber; a partition baffle extending across the reaction chamber at an upper level therein and having elongated rectangular openings therein for dividing the downwardly moving contact material into a series of paths, each of said rectangular openings having a rectangular discharge chute depending therefrom below the baffle; a removable delivery conduit assembly including a plurality of pipe-like conduits passing through glands in the wall of the casing and extending across the reaction chamber beneath the respective discharge chutes, said pipe-like conduits having distributed discharge openings arranged to spread a liquid hydrocarbon charge over the cross-sectional area of the chamber; rigid supporting means carried by the end portions of said chutes and having openings slidably receiving said pipe-like conduits; and vapor outlet means connected with the reaction chamber immediately below the baffle for removing hydrocarbon vapors from the space surrounding the discharge chutes.

AUGUST H. SCHUTTE.

REFERENCES CITED

The following references are of record in the file of this patent:

UNITED STATES PATENTS

| Number | Name | Date |
|---|---|---|
| 1,505,870 | Culmer | Aug. 19, 1924 |
| 2,348,699 | Tuttle | May 9, 1944 |
| 2,386,670 | Evans | Oct. 9, 1945 |
| 2,390,031 | Schutte et al. | Nov. 27, 1945 |
| 2,405,395 | Bahlke et al. | Aug. 6, 1946 |
| 2,418,673 | Sinclair et al. | Apr. 8, 1947 |
| 2,432,344 | Sinclair | Dec. 9, 1947 |